(12) United States Patent
Li et al.

(10) Patent No.: US 8,045,253 B2
(45) Date of Patent: Oct. 25, 2011

(54) SUB-DIFFRACTION-LIMITED IMAGING SYSTEMS AND METHODS

(75) Inventors: Jingjing Li, Palo Alto, CA (US); Philip J. Kuekes, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 187 days.

(21) Appl. No.: 12/473,402

(22) Filed: May 28, 2009

(65) Prior Publication Data
US 2010/0302625 A1    Dec. 2, 2010

(51) Int. Cl.
*G02F 1/03* (2006.01)
*G02F 1/29* (2006.01)
*G02B 5/18* (2006.01)

(52) U.S. Cl. ........ 359/245; 359/315; 359/319; 359/558; 359/566; 356/521

(58) Field of Classification Search .................... 359/34, 359/315, 319, 279, 370, 298, 558, 559, 562, 359/563, 565, 566, 569; 356/217, 432, 450; 382/190, 206; 250/237 G
See application file for complete search history.

(56) References Cited

U.S. PATENT DOCUMENTS

| | | | | |
|---|---|---|---|---|
| 5,568,574 A * | 10/1996 | Tanguay et al. | ................. | 385/14 |
| 5,576,829 A * | 11/1996 | Shiraishi et al. | ............... | 356/521 |
| 5,892,620 A * | 4/1999 | Stone | ............................ | 359/566 |
| 6,801,348 B2 * | 10/2004 | Ramapujam et al. | ........... | 359/34 |
| 2009/0310214 A1* | 12/2009 | Brueck et al. | ................. | 359/370 |
| 2009/0316141 A1* | 12/2009 | Feldkhun | ....................... | 356/217 |
| 2010/0008588 A1* | 1/2010 | Feldkhun et al. | ............. | 382/206 |

* cited by examiner

*Primary Examiner* — Loha Ben

(57) ABSTRACT

Various embodiments of the present invention are directed to systems and methods for obtaining images of objects with higher resolution than the diffraction limit. In one aspect, a method for collecting evanescent waves scattered from an object comprises electronically configuring a reconfigurable device to operate as a grating for one or more lattice periods using a computing device. Propagating waves scattered from the object pass through the reconfigurable device and a portion of evanescent waves scattered from the object are projected into the far field of the object. The method includes detecting propagating waves and detecting the portion of evanescent waves projected into the far field for each lattice period using an imaging system.

20 Claims, 15 Drawing Sheets

SUB-DIFFRACTION-LIMITED IMAGING SYSTEMS AND METHODS

TECHNICAL FIELD

Embodiments of the present invention relate to imaging, and, in particular, to methods and systems for imaging sub-wavelength features of objects.

BACKGROUND

When light strikes an object, visual feature information is transferred to light scattered from the object. The scattered light comprises various wave vectors of propagating and evanescent wave components. The propagating waves carrier large feature information that reaches the far field and can be collected using lenses and an image sensor to reconstruct an image of the object. By contrast, evanescent waves carry more detailed visual information regarding relatively smaller features of the object, but evanescent waves exponentially decay and are confined to the near field of the object. Thus, when a conventional lens is used to collect the light scattered from an object, the evanescent waves are lost before reaching the image plane. This inability to capture evanescent waves scattered from features smaller than half the illumination wavelength is called the "diffraction limit."

FIG. 1 shows a schematic representation of the operation of a conventional lens 102. Curve 104 represents propagating waves scattered from an object plane of the object. The propagating waves carry large feature information, pass through the lens 102 and reach the image plane in the far field, where the large feature information of the object are reproduced in an image of the object that can be observed or collected in the far field. On the other hand, curve 106 represents exponential decay of the evanescent waves scattered from the object plane in the near field. Any fine feature visual information contained in the evanescent waves is substantially lost before reaching the lens 102.

In recent years, superlenses have been proposed with the potential to recover lost evanescent waves. This is accomplished by coupling evanescent waves scattered from the object to surface excitations on a slab of negative refractive index material. A superlens compensates for evanescent wave decay in the near field of the object using the strong enhancement provided by the surface excitations, which restore the evanescent wave components. However, typical superlenses are capable of projecting small feature information into the near field of the superlens.

FIG. 2 shows a schematic representation of the operation of a metamaterial superlens 202. Propagating waves pass through the superlens 202 into the far field, as described above for the conventional lens 102. However, unlike the conventional lens 102, evanescent waves are magnified within the superlens 202, as indicated by exponentially increasing curve 204. FIG. 2 includes a dashed line that conceptually separates the near field of the superlens 202 from the far field. The superlens 202 projects the evanescent waves magnified within the superlens 202 into the near field of the superlens 202 where the evanescent waves exponentially decay again, as indicated by curve 206.

One disadvantage of metamaterial superlenses is that they typically are capable of projecting small feature information into the near field of the superlens. Thus, fine feature information of the object can only be observed in the near field of the superlens and cannot be practically observed in the far field. A second disadvantage of superlenses is negative permeability u can be difficult to achieve for radiation in the visible portion of the electromagnetic spectrum. Thus, in practice, a slab of plasmonic material with a negative permittivity 8 can be used as a superlens for radiation in the visible spectrum. Such plasmonic-based superlenses are only capable of projecting evanescent waves into the near field of the superlens and only for evanescent waves with transverse magnetic component polarization. Finally, plasmonic materials and metamaterials both exhibit significant loss, which reduces the quality of the image.

Fabricating a perfect lens that captures high resolution images of sub-wavelength features of objects has long been desired by lens makers and microscope manufacturers. Lenses that are capable of projecting evanescent waves scattered from of object into the far field are desired.

DETAILED DESCRIPTION

Various embodiments of the present invention are directed to systems and methods for obtaining images of objects with higher resolution than the diffraction limit. In particular, the systems include reconfigurable devices that can be electronically configured as gratings with various lattice spacings and grating configurations. The devices can be placed within the near field of the objects and operated to project propagating and evanescent wave components scattered from the objects into the far field where the propagating and evanescent waves can be collected and processed to obtain images of the objects with higher resolution than the diffraction limit.

Electronically Reconfigurable Devices

Figure 1:
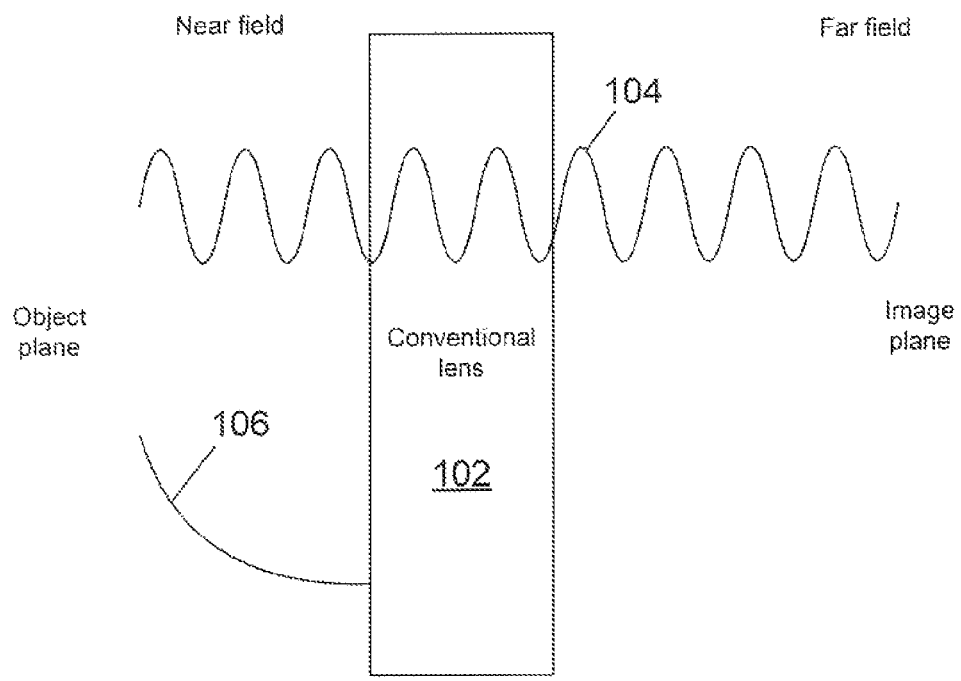
FIG. 1 shows a schematic representation of the operation of a conventional lens.
Figure 2:
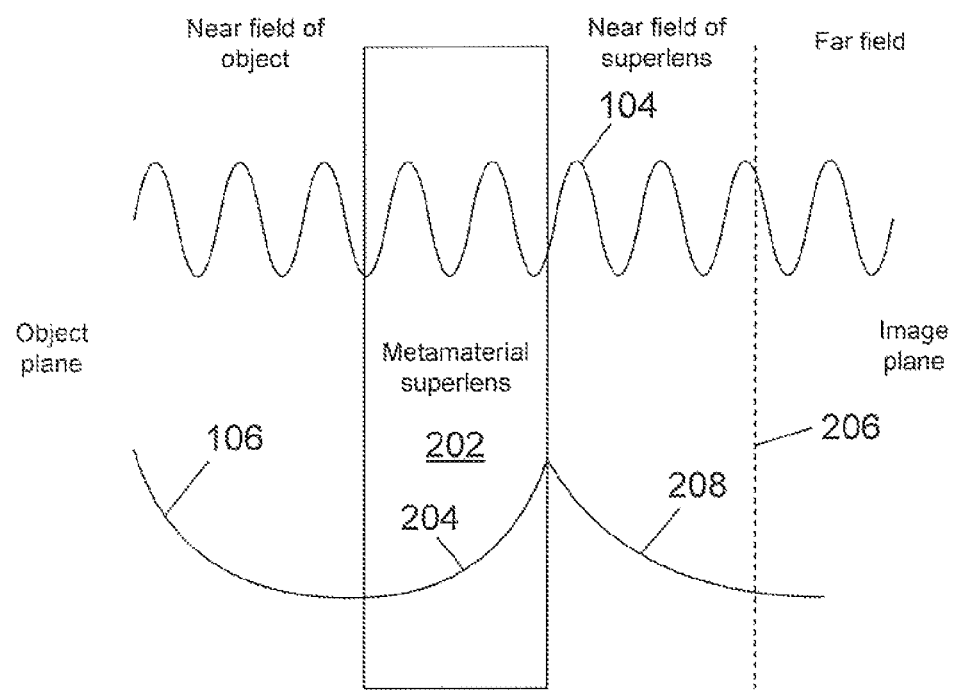
FIG. 2 shows a schematic representation of the operation of a metamaterial superlens.
Figure 3:
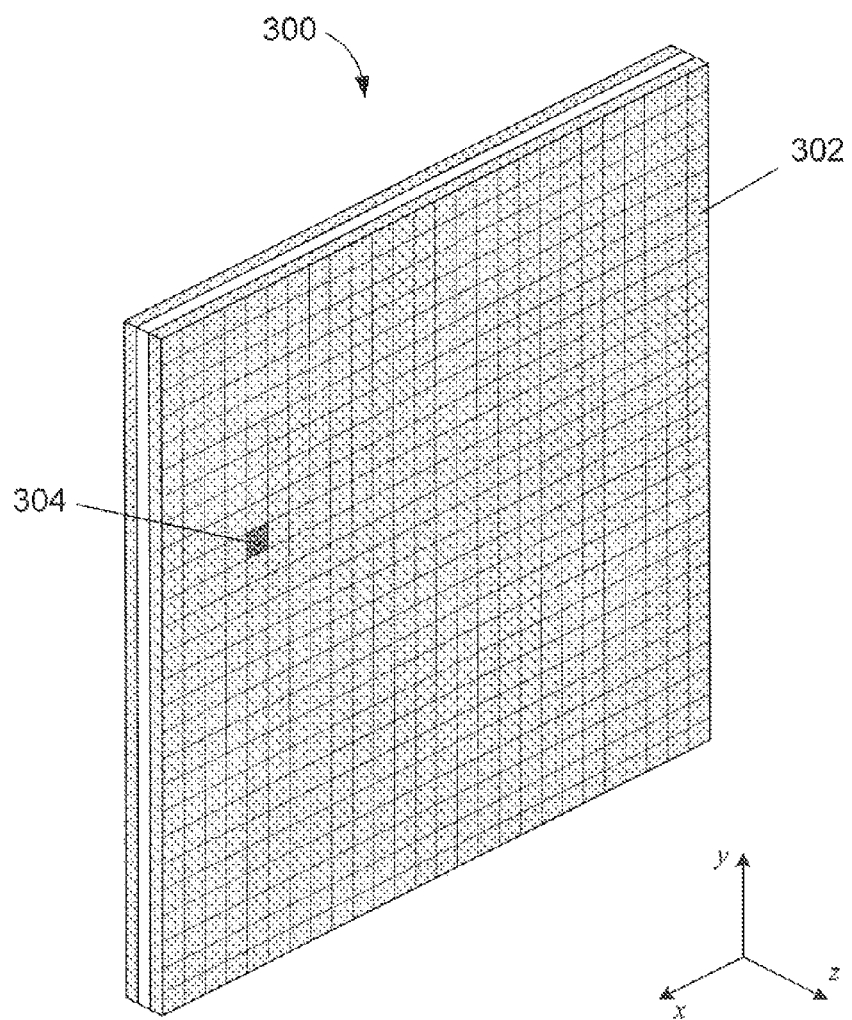
FIG. 3 shows an isometric view of an electronically reconfigurable device configured in accordance with embodiments of the present invention.

FIG. 3 shows an isometric view of an electronically reconfigurable device 300 configured in accordance with embodiments of the present invention. As shown in the example of FIG. 3, the surface 302 of the device 300 includes grid lines that outline a two-dimensional array of squares, each square representing a "phase-modulation element." The refractive index of each phase-modulation element can be independently and electronically controlled. In other words, the phase-modulation elements are "electronically addressable." For example, square 304 represents a phase-modulation element 304. An electronic signal (i.e., voltage or current) applied to the element 304 induces a change in the effective refractive index of the element 304.

Figure 4:
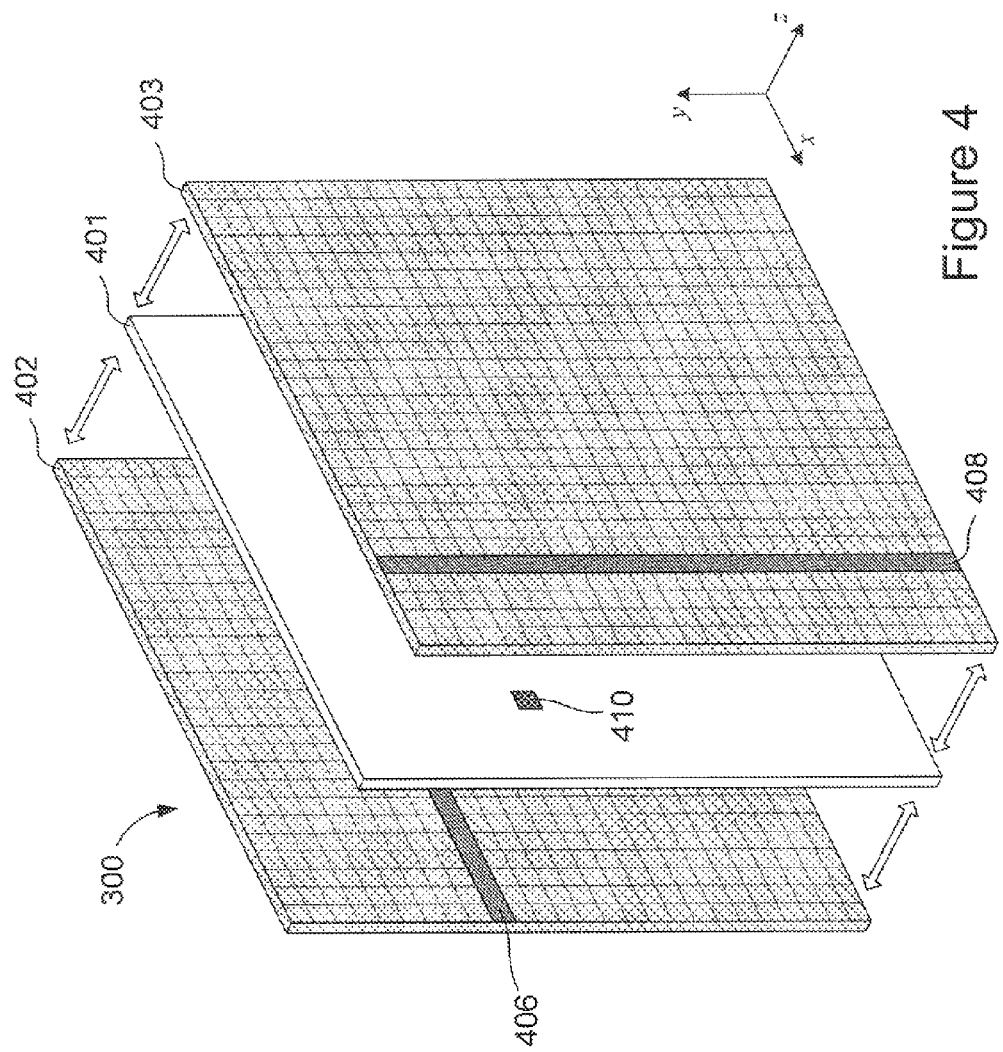
FIG. 4 shows an exploded isometric view of the reconfigurable device, shown in FIG. 3, configured in accordance with embodiments of the present invention.

FIG. 4 shows an exploded isometric view of the device 300 configured in accordance with embodiments of the present invention. As shown in FIG. 4, the device 300 comprises an intermediate phase-modulation layer 401 sandwiched between two outer conductive layers 402 and 403. Each phase-modulation element is electronically addressed as follows. The conductive layers 402 and 403 are configured so that electronic signals can be applied to substantially orthogonal overlapping strips or bands of the conductive layers 402 and 403. Each intersection of overlapping strips in layers 402 and 403 corresponds to a phase-modulation element. For example, as shown in FIG. 4, applying an appropriate electronic signal to a first strip 406 of conductive layer 402 running substantially parallel to the x-axis and simultaneously applying an appropriate electronic signal to a second strip 408 of conductive layer 403 running substantially parallel to the y-axis produces a voltage across, or current through, a region 410 of layer 401. As a result, the refractive index of the region 410 is changed.

Figure 5:
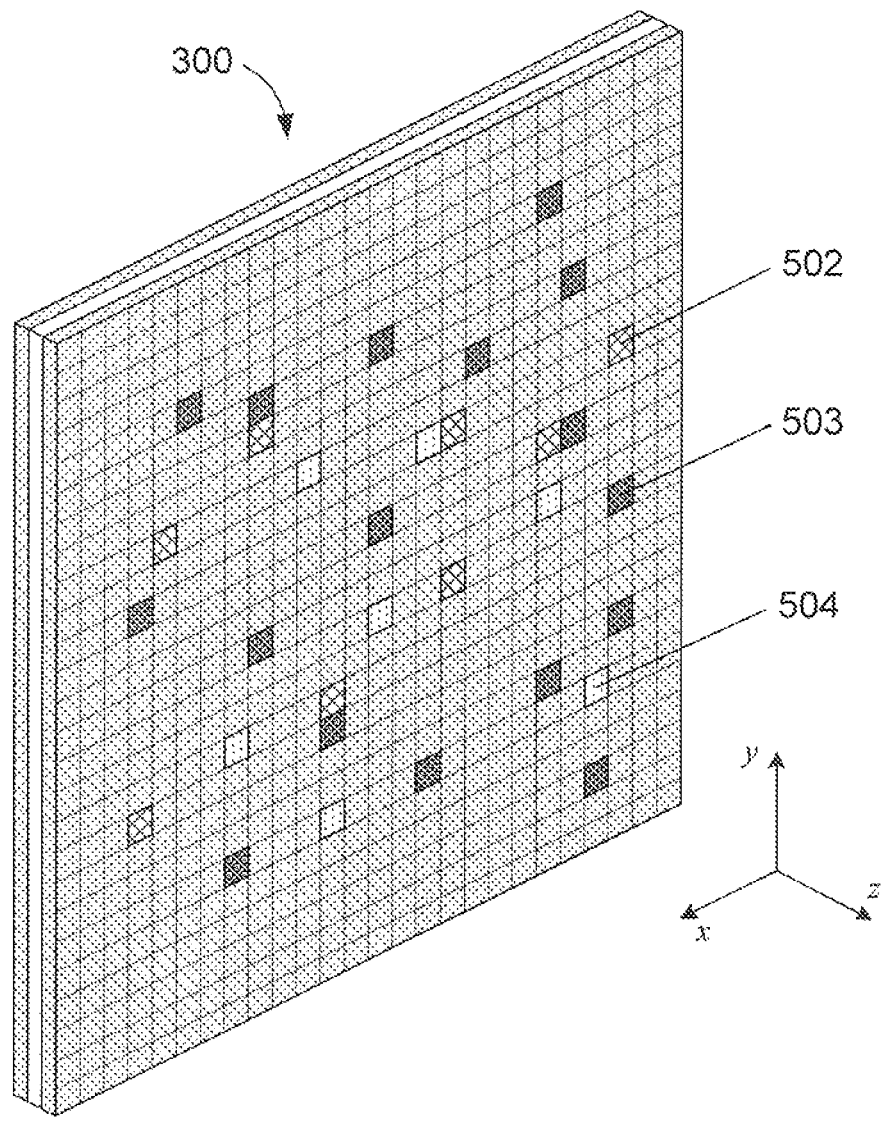
FIG. 5 shows a number of highlighted phase-modulation elements of the reconfigurable device, shown in FIG. 3, having different refractive indices in accordance with embodiments of the present invention.

The degree to which the refractive index is changed can vary depending on the magnitude of the electronic signal. FIG. 5 shows a number of highlighted phase-modulation elements having different refractive indices in accordance with embodiments of the present invention. Each element is electronically addressable as described above with reference to FIG. 4, and depending on the magnitude of the electronic signal applied to each element, the effective refractive index of each element can be separately adjusted. For example, shaded elements 502-504 each represent elements having different effective refractive indices which result from applying different electronic signals to each of the elements 502-504. The change in the effective refractive index can range from a few percent to approximately 10% or more.

Figure 6:
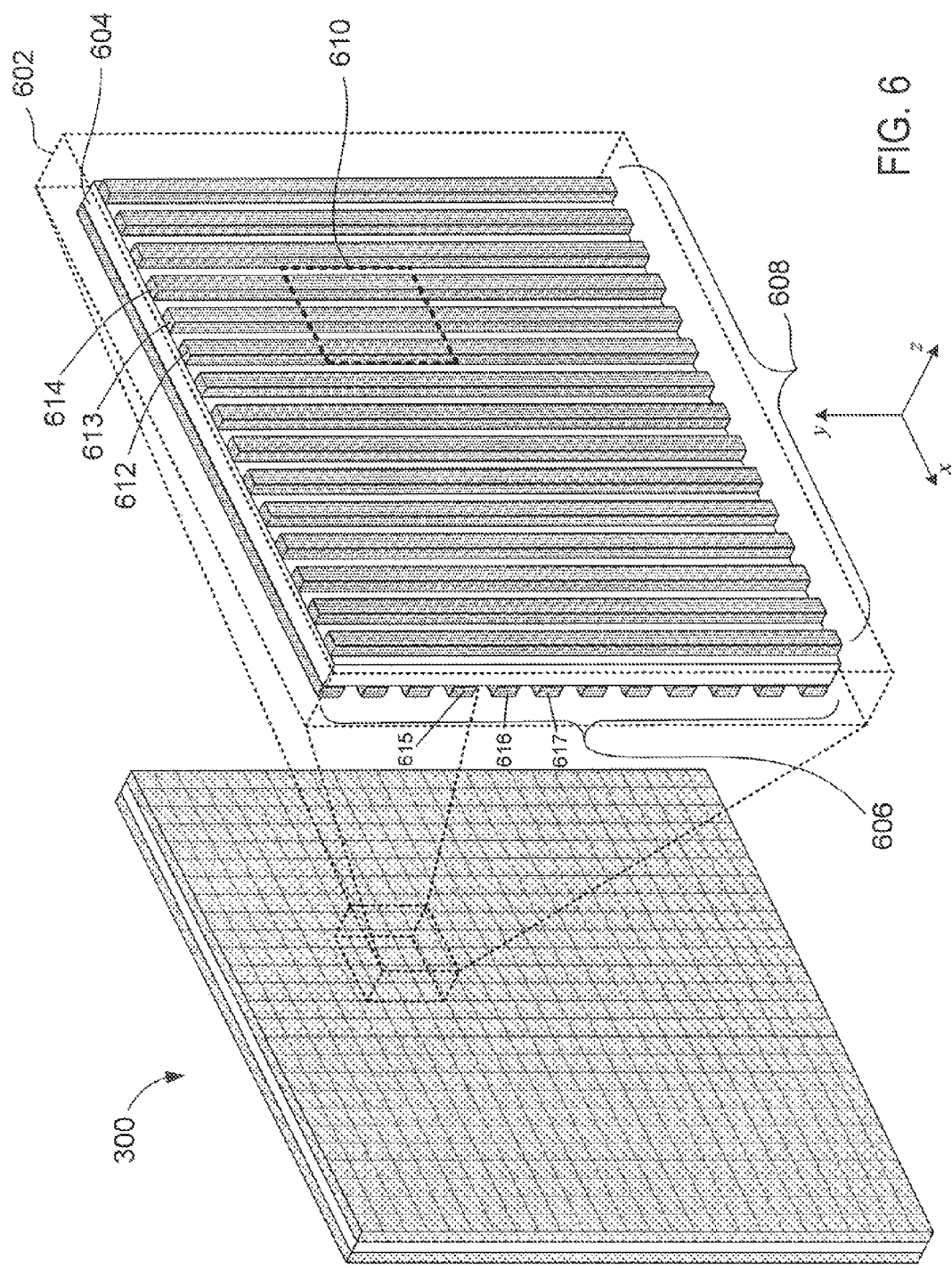
FIG. 6 shows an isometric view and an enlargement of a region of the reconfigurable device, shown in FIG. 3, in accordance with embodiments of the present invention.

The electro-optical device 300 can be configured as a nanowire crossbar. FIG. 6 shows an isometric view and an enlargement of a region 602 of the electro-optical device 300 in accordance with embodiments of the present invention. The enlarged region 602 reveals the electro-optical device 300 can be implemented as a crossbar comprising a portion 604 of the intermediate layer 401 sandwiched between a first layer of non-crossing approximately parallel nanowires 606 and a second layer of non-crossing approximately parallel nanowires 608, where the nanowires in the first layer 606 are approximately perpendicular to the nanowires in the second layer 608. The term "nanowire intersection" refers to the place in material 300 where a nanowire in the first layer 606 overlays a nanowire in the second layer 608. FIG. 6 also includes a phase-modulation element 610 identified by a dashed-line enclosure and corresponding nanowires 612-614 overlaying nanowires 615-617. Appropriate electronic signals applied to nanowires 612-614 and nanowires 615-617 changes the effective refractive index of the portion of the layer 604 between the nanowires 612-614 and the nanowires 615-617, as described above with reference to FIG. 3. Depending on the material selected for the layer 604 and the magnitude of the electronic signals applied to the nanowires 612-617, the effective refractive index of the phase-modulation element 610 can increased or decreased accordingly. The nanowire intersections can be configured with dimensions that are smaller than the wavelength $\lambda$ of electromagnetic radiation incident on the crossbar 300.

Embodiments of the present invention are not limited to phase-modulation elements comprising a square array of nine nanowire intersections. Because voltages can be applied to individual crossed nanowires, a phase-modulation elements can range from as few as one to hundreds or even thousands of nanowire intersections. In addition, the individual nanowires enable phase-modulation elements to have various shapes such as square, rectangular, circular, elliptical, triangular, or any other suitable shape.

The crossbar layers can be fabricated by mechanical nanoimprinting techniques. Alternatively, nanowires can be chemically synthesized and can be deposited as layers of approximately parallel nanowires in one or more processing steps, including Langmuir-Blodgett processes with subsequent patterning. Other alternative techniques for fabricating nanowires may also be employed. Thus, a two-layer nanowire crossbar comprising first and second layers of nanowires, as shown in FIG. 6, can be manufactured by any of numerous relatively straightforward processes. Many different types of conductive and semi-conductive nanowires can be chemically synthesized from metallic and semiconductor substances, from combinations of these types of substances, and from other types of substances. A nanowire crossbar may be connected to microscale address-wire leads or other electronic leads, through a variety of different methods in order to electronically couple the nanowires to electronic devices.

The nanowires can be comprised of silver (Ag), gold (Au), copper (Cu), aluminum (Al), platinum (Pt), or another suitable electronically conducting metal, or the nanowires can be composed of heavily doped semiconductors depending on the frequency of incident electromagnetic radiation.

The intermediate layer 401, shown in FIG. 4, can be composed of electro-optical material with refractive index properties that can vary according to the particular molecular configuration or electronic states of the material and exhibit an appreciable refractive index change in response to externally applied electric fields. For example, the intermediate layer 401 can be composed of lithium niobate ($LiNbO_3$). In certain embodiments, the electro-optical material may transition reversibly from one state to another and back, so that a portion of the intermediate layer 401 comprising a phase-modulation element may be reconfigured, or programmed, by application of differential electronic signals. The molecules comprising the intermediate layer 401 may have various different states in which the molecules exhibit resistive, semiconductor-like, or conductive electrical properties. The states and relative energies of the states of the intermediate layer 401 may be controlled by applying differential current levels or voltages to the overlapping nanowires. For example, in certain embodiments, certain states of the intermediate layer 401 materials can be set by applying electronic signals to the corresponding nanowires. In certain embodiments, the applied electronic signals can change the oxidation or redox state of the electro-optical material which induces a change in the refractive index of the nanowire intersection. Additional circuit elements such as diodes, transistors, memristors, capacitors, and resistors for optimal performance may also be formed at nanowire intersections or a part of the nanowire crossbar. A nanowire crossbar can also be integrated with CMOS circuits.

Figure 7:
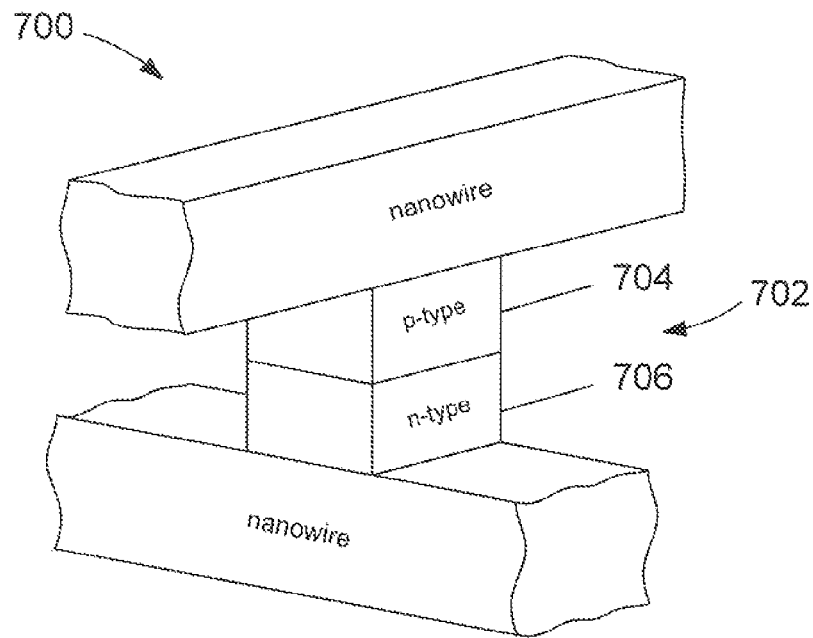
FIG. 7 shows an isometric view of a nanowire intersection configured with a p-n junction in accordance with embodiments of the present invention.

In certain embodiments, the electro-optical material can be selected so that nanowire intersections can be configured and operated as p-n junctions in order to change the refractive index of the phase-modulation elements by carrier injection. FIG. 7 shows an isometric view a nanowire intersection 700 configured with a p-n junction electro-optical material layer 702 in accordance with embodiments of the present invention. The p-n junction 702 can be composed of a wide variety of semiconductor materials including various combinations of elemental and compound semiconductors. Indirect elemental semiconductors include silicon (Si) and germanium (Ge), and compound semiconductors include III-V materials, where Roman numerals III and V represent elements in the IIIa and Va columns of the Periodic Table of the Elements. Compound semiconductors can be composed of column IIIa elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

As shown in FIG. 7, p-n junction 702 includes a p-type layer 704 and an n-type layer 706, where the p-type layer 704 is doped with electron accepting impurities and the n-type layer 706 is doped with electron donating impurities. The impurities also called dopants can be atoms. The dopants can be p-type impurities, which are atoms that introduce vacant electronic energy levels called "holes" to the electronic band gaps of the p-n junction 702. These impurities are also called "electron acceptors." The dopants can be n-type impurities, which are atoms that introduce filled electronic energy levels to the electronic band gap of the p-n junction 702. These impurities are called "electron donors." For example, boron (B), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the p-type and n-type layers can have impurity concentrations in excess of about $10^{15}$ impurities/cm$^3$ while heavier doping can have impurity concentrations in excess of about $10^{19}$ impurities/cm$^3$.

The refractive index of the p-n junction 702 can be adjusted by varying the magnitude and type of bias applied to p-n junction 702. For example, a forward bias injects electrons into the n-type layer and vacant electronic states called "holes" are injected into the p-type layer. Under a reverse bias, electrons are injected into the p-type layer and holes are injecting into the n-type layer. However, once the bias is removed, the electrons and holes are swept out of the layers and the p-n junction 702 returns to an unbiased electronic state. The refractive index of the p-n junction 702 is different under the forward, reverse, and no bias.

Figure 8:
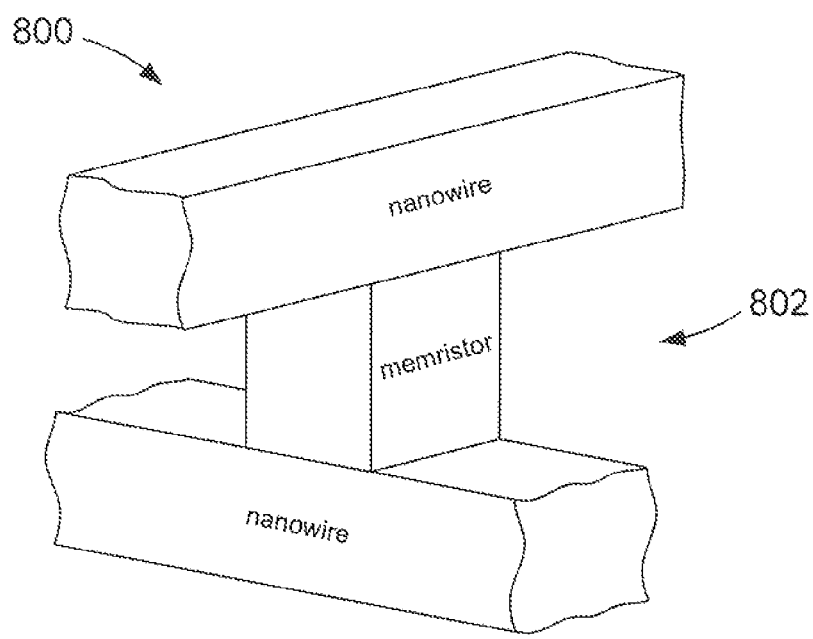
FIG. 8 shows an isometric view of a nanowire intersection configured with a memristor layer in accordance with embodiments of the present invention.

In other embodiments, the electro-optical material can be selected so that nanowire intersections can be configured and operated as memristors that can change and retain their resistance state even after the bias has been removed. Each resistance state corresponds to a different refractive index. FIG. 8 shows an isometric view a nanowire intersection 800 configured with a memristor layer 802 in accordance with embodiments of the present invention. The memristor layer 802 includes a primary active region, or layer, and a secondary active region, or layer. The primary active region comprises a thin film of a material that is electronically semiconducting or nominally electronically insulating and can also be a weakly ionic conductor. The primary active material is capable of transporting and hosting ions that act as dopants to control the flow of electrons through the nanowire intersection 800. The basic mode of operation can be to apply a voltage bias of an appropriate magnitude and polarity across the memristor layers at the junctions. The electrical field, also called a "drift field," enables the motion of the dopants in the primary material to drift into or out of the primary material via ionic transport. The ionic species are specifically chosen from those that act as electrical dopants for the primary material, and thereby change the rectifying state of the primary active material. The memristor layer 802 can be placed in one of the four different types of rectifying states: a forward rectifier, a reverse rectifier, a head-to-head rectifier, and a shunted rectifier, as shown in FIG. 8. Each of the rectifying states corresponds to a different refractive index.

In addition, the primary active material and the dopants are chosen such that the drift of the dopants into or out of the primary active material is possible but not too facile in order to ensure that the memristor layer 802 remains in a particular rectifying state for a reasonable period of time, perhaps for many years at room temperature. This ensures that the memristor layer 802 is nonvolatile. In other words, the memristor layer 802 holds its rectifying state (i.e., keeps memory of its resistive state) after the drift field has been removed. Applying a drift field with a large enough magnitude causes both electron current and dopant to drift, whereas applying biases with lower relative voltage magnitudes than the drift field causes negligible dopant drift enabling the nanowire intersection to hold its rectifying state.

On the other hand, the secondary active region comprises a thin film that is a source of dopants for the primary active material. These dopants may be impurity atoms such as hydrogen or some other cation, such as alkali or transition metals, that act as electron donors for the primary active material. Alternatively, the dopants can be anion vacancies, which in the primary active material are charged and therefore are also electron donors for the lattice. It is also possible to drive the anions into the primary active material, which become electron acceptors or hole donors.

The primary active material can be nanocrystalline, nanoporous, or amorphous. The mobility of the dopants in such nanostructured materials is much higher than in bulk crystalline material, since diffusion can occur through grain boundaries, pores or through local structural imperfections in an amorphous material. Also, because the primary active material film is thin, the amount of time needed for dopants to diffuse into or out of region of the film to substantially change the film's conductivity is relatively rapid. For example, the time needed for a diffusive process varies as the square of the distance covered, so the time to diffuse one nanometer is one-millionth the time to diffuse one micrometer.

The primary active and secondary active regions of the memristor layer 802 are contacted on either side by nanowires or one of the nanowires can be composed of a semiconductor material and the other a metal. When the memristor layer 802 is composed of semiconductor material, the contract between a metal electrode and the memristor layer 802 depletes the memristor layer 802 of free charge carriers. Thus, the memristor layer 802 has a net charge that depends on the identity of the dopant which is positive in the case of electron donors and negative in the case of electron acceptors.

Switching from one rectifying state to another can be accomplished by applying an electric field of an appropriate magnitude and polarity across the memristor layer 802. The electric field forces the dopants to drift into or out of the electrode/active region interface regions thus changing the rectifying state of the memristor layer 802. An appropriate electric field can be used to force dopants located near the interfaces of the shunted rectifier to move to one of the interfaces thus changing the shunted rectifier into either the forward rectifier or the reverse rectifier.

The ability of the charged species to diffuse into and out of the primary active material may be substantially improved if one of the interfaces connecting the memristor layer 802 to a metal or semiconductor electrode is non-covalently bonded. Such an interface may be caused by a void in the material or it may be the result of an interface that contains a material that does not form covalent bonds with the electrode, the primary active material, or both. This non-covalently bonded interface lowers the activation energy of the atomic rearrangements that are needed for drift of the dopants in the primary active material. This interface is essentially an extremely thin insulator, and adds very little to the total series resistance of the nanowire intersection.

The primary and secondary active materials of the memristor layer 802 can be oxides, sulfides, selenides, nitrides, phosphides, arsenides, chlorides, hydrides, and bromides of the transition and rare earth metals, with or without the alkaline earth metals being present. In addition, there are various alloys of these compounds with each other, which can have a wide range of compositions if they are mutually soluble in each other. In addition, the memristor layer 802 can be composed of mixed compounds, in which there are two or more metal atoms combined with some number of electronegative elements. The dopants can be anion vacancies or different valence elements doped in the memristor layer 802. One combination of materials is a primary active material that is undoped and stoichiometric, and thus a good insulator, combined with a secondary source/sink of the same or related parent material that either contains a large concentration of anion vacancies or other dopants that can drift into the primary material under the application of an appropriate bias.

The memristor layer 802 can be composed of oxides that contain at least one oxygen atom (O) and at least one other element. In particular, the memristor layer 802 can be composed of silica ($SiO_2$), titania ($TiO_2$), nickel-oxide (NiO), zirconia ($ZrO_2$), and hafnia ($HfO_2$) with or without 3d impurities (e.g., Cr, Mn), or sp-impurities (e.g., Li, Be, Ca). These materials are compatible with silicon (Si) integrated circuit technology because they do not create doping in the Si. Other embodiments for the memristor layer 802 include alloys of these oxides in pairs or with all three of the elements Ti, Zr, and Hf present. For example, the memristor layer 802 can be composed of $Ti_xZr_yHf_xO_2$, where x+y+z=1. Related compounds include titanates, zirconates, and hafnates. For example, titanates includes $ATiO_3$, where A represents one of the divalent elements strontium (Sr), barium (Ba) calcium (Ca), magnesium (Mg), zinc (Zn), and cadmium (Cd). In general, the memristor layer 802 can be composed of $ABO_3$, where A represents a divalent element (e.g., $Sr^{++}$, $Ba^{++}$) and B represents $Ti^{4+}$, $Zr^{4+}$, and $He^{4+}$. The memristor layer 802 can also be composed of alloys of these various compounds, such as $Ca_aSr_bBa_cTi_xZr_yHf_zO_3$, where a+b+c=1 and x+y+z=1. There are also a wide variety of other oxides of the transition and rare earth metals with different valences that may be used, both individually and as more complex compounds. In each case, the mobile dopant can be an oxygen vacancy or an aliovalent element doped into the memristor layer 802. The oxygen vacancies effectively act as dopants with one shallow and one deep energy level. Because even a relatively minor nonstoichiometry of about 0.1% oxygen vacancies in $TiO_2$, is approximately equivalent to $10^{20}$ dopants/$cm^3$, modulating oxygen vacancy profiles have strong effect on electron transport.

In other embodiments, the memristor layer 802 can be a sulfide or a selenide of the transition metals with some ionic bonding character, essentially the sulfide and selenide analogues of the oxides described above.

In other embodiments, the memristor layer 802 can be a semiconducting nitride or a semiconducting halide. For example, semiconducting nitrides include AiN, GaN, ScN, YN, LaN, rare earth nitrides, and alloys of these compounds and more complex mixed metal nitrides, and semiconducting halides include CuCl, CuBr, and AgCl. The memristor layer 802 can be a phosphide or an arsenide of various transition and rare earth metals. In all of these compounds, the mobile dopant can be an anion vacancy or an aliovalent element.

A variety of dopants can be used and are selected from a group consisting of hydrogen, alkali, and alkaline earth cations, transition metal cations, rare earth cations, oxygen anions or vacancies, nitrogen anions or vacancies, pnictide anions or vacancies, or halide anions or vacancies. Other suitable materials include metal hydrides, such as $Mg_2NiH_4$, $Mg_2MnH_7$, $Mg_6Co_2H_{11}$, $Mg_2CoH_5$, $Mg_2CoH_5$, and $Mg_2FeH_6$, and copper oxides, such as $Cu_2O$ and CuO, exhibit large changes in refractive indices.

Operation of Electronically Reconfigurable Devices

Figure 9:
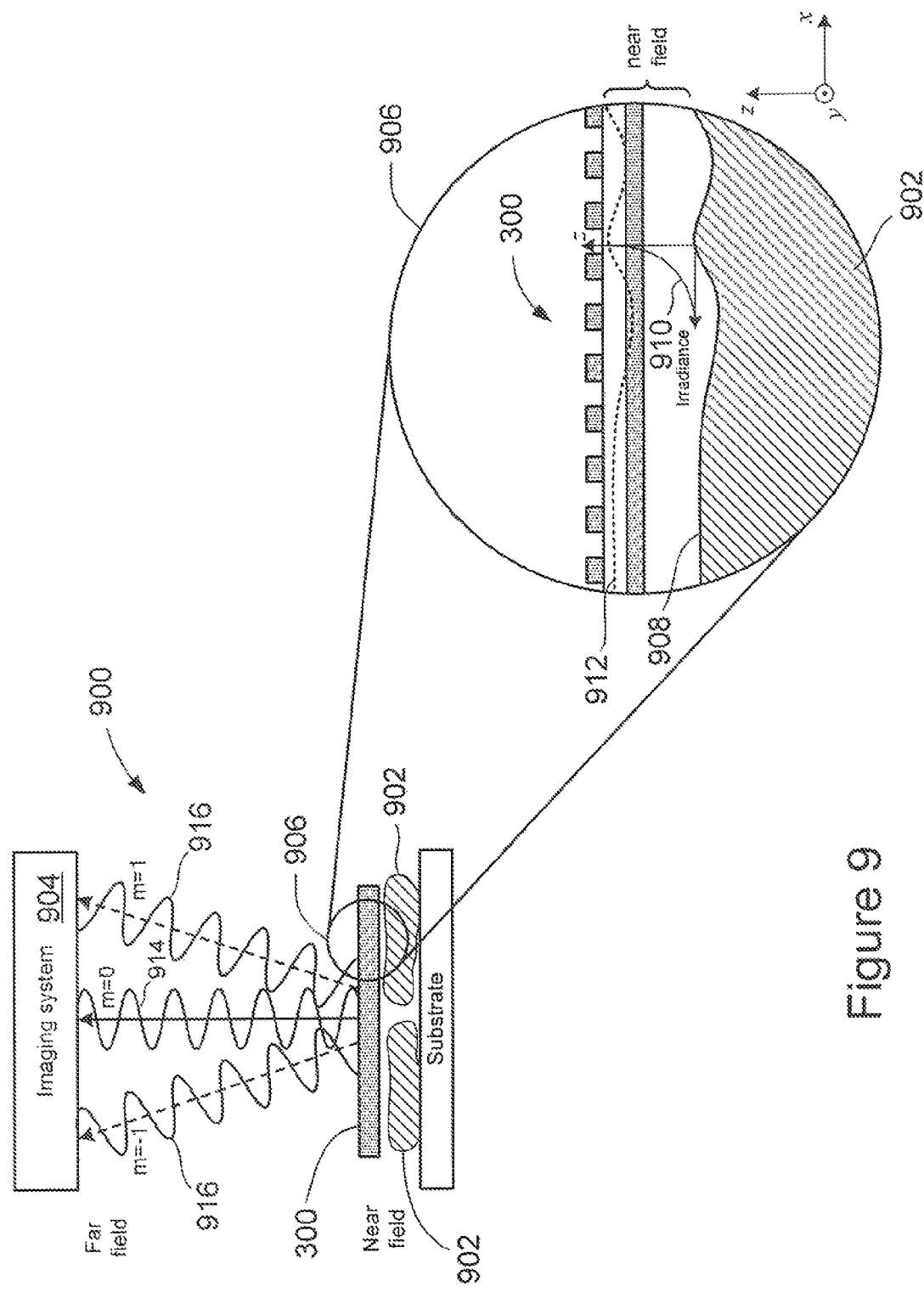
FIG. 9 shows a side-view and schematic representation of a system for capturing an image in accordance with embodiments of the present invention.

FIG. 9 shows a side-view and schematic representation of a system 900 for capturing an image of objects 902 with higher resolution than the diffraction limit in accordance with embodiments of the present invention. The system 900 includes the reconfigurable device 300 and an imaging system 904. The imaging system 904 includes an image sensor, such as a digital camera image sensor or photodetector array, and may include lenses and an aperture for capturing and directing propagating and evanescent waves to the image sensor. The device 300 is placed in close proximity to the objects 902. FIG. 9 includes an enlargement 906 of the reconfigurable device 300 placed within at least a portion of the near field emitted from the surface 908. Enlargement 906 includes a plot of a curve 910 that represents the exponential decay of evanescent field irradiance from the object surface 908. Dashed-line curve 912 conceptually represents the extent to which the near field extends beyond the surface 908. As shown in the example of FIG. 9, the reconfigurable device 300 is disposed so that at least a portion of the device 300 lies within the near field. Operating the device 300 as described below with reference to FIGS. 10-12 projects the propagating waves 914 and the evanescent waves 916 into the far field where the waves can be detected by the imaging system 904 and processed to produce image with resolution higher than the diffraction limit.

Figure 10A:
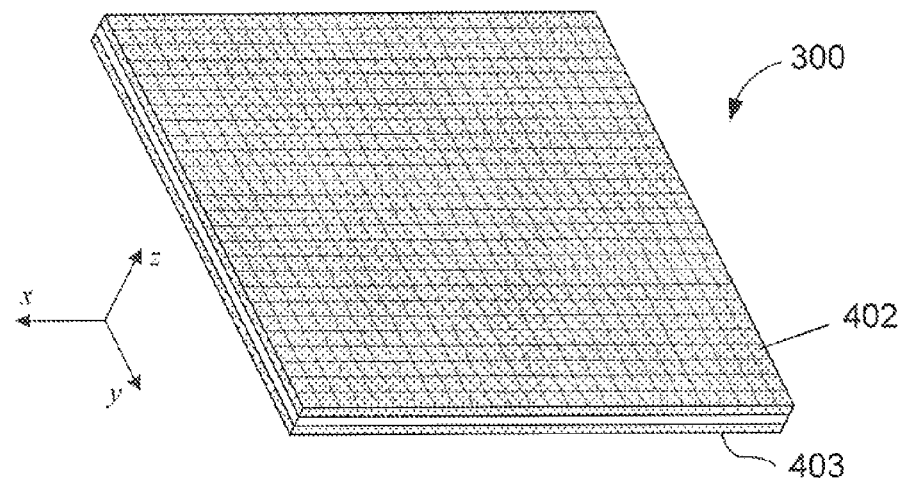
FIGS. 10A-10B show operation of an electronically reconfigurable device in a "no-grating" state in accordance with embodiments of the present invention.

After the reconfigurable device 300 is placed within at least a portion of the near field, the device 300 can be operated in a "no-grating" state in order to obtain image data associated with the propagating waves scattered from the objects 902. FIG. 10A shows an isometric view of the device 300 in a "no-grating" state in accordance with embodiments of the present invention. The no-rating state is created by applying no electronic signals to the conducting layers 402 and 403 of the device 300 as described above with reference to FIG. 4. As a result, the device 300 has a substantially uniform effective refractive index and the propagating waves 914 pass through the device 300, as shown in FIG. 9. The propagating waves have associated lateral spatial components lying within the xy-plane of the device 300 which satisfy the condition:

$$|k| \leq k_0$$

where k is the lateral spatial component wavenumber, and $k_0$ is the free space wavenumber.

Figure 10B:
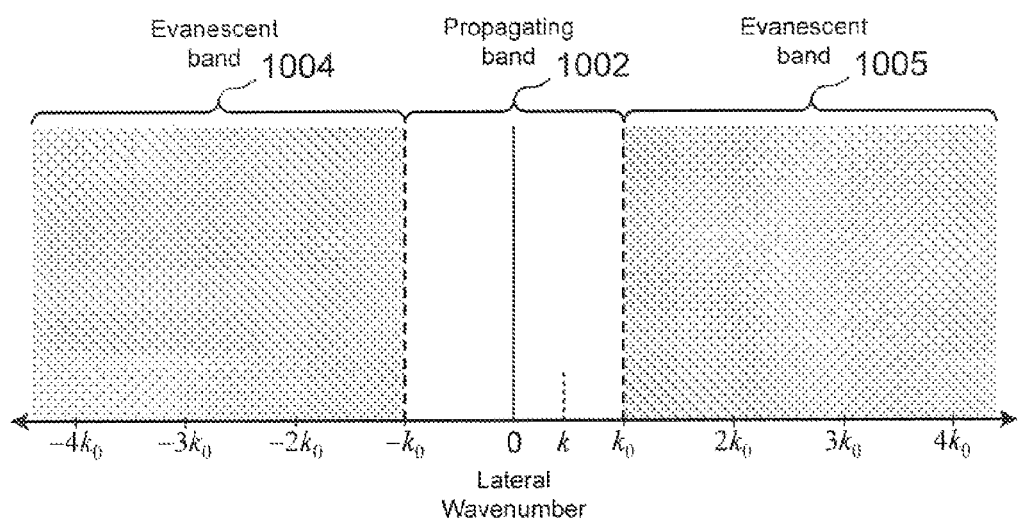

FIG. 10B shows a plot of a propagating band 1002 and evanescent bands 1004 and 1005 associated with the no-grating state of the device 300 in accordance with embodiments of the present invention. The wavenumbers of the lateral spatial components associated with propagating waves lie within the propagating band 1002. The lateral spatial components of the evanescent waves have lateral wavenumbers k satisfying the condition:

$$k_0 < |k|$$

and the evanescent waves do not reach the far field. Thus, when the device 300 is placed in the no-grating state, propagating waves 914 reach the imaging system 904 and propagating image data is recorded by the imaging system 904. Since the transfer function of the device 300 can be obtained through a calibration process prior to collecting the image data or at the time of fabrication, the propagating image data of the object can be processed using well-known methods in order to obtain an image of the objects 902 with resolution determined by the diffraction limit, which can be optimized by configuring the device 300 to operate as a grating, as described below in subsequent steps.

In certain embodiments, when the device 300 is electronically configured with a one-dimensional grating, as described below with reference to the examples shown in FIGS. 11 and 12, images with higher resolution of the objects 902 can be achieved. The grating causes the propagating components to include zero order diffraction (m=0) of propagating waves and first order diffraction (m=±1) of electromagnetic waves emitted from the objects 902, shown in FIG. 9. The higher order diffractions, such as m=±2 and m=±3, can be neglected due to low diffraction efficiency. The grating causes part of the high spatial frequency of the electromagnetic radiation emitted from the objects 902 in the near field to be first order diffracted and propagate into the far field where the electromagnetic radiation can be detected by the imaging system 904. For a grating of period L, the propagating components captured by the imaging system 904 include propagating waves 914 with zero order diffraction and associated wavenumbers k satisfying:

$$|k| \leq k_0$$

and the evanescent waves 916, shown in FIG. 9, projected into the far field with first order diffraction and associated wavenumbers k satisfying:

$$k_0 < |k \pm k_L|$$

where $k_L = 2\pi/L$. In order to separate the three overlapping propagating components (i.e., m=0,±1), multiple measurements can be taken for each lattice period with the imaging system 904, each measurement taken with a different phase shift between the grating and the object. Combining the measurement results obtained for the device 300 in the no-grating state $|k| \leq k_0$ with the measurement results obtained for the grating $k_0 < |k \pm k_L|$ a high-resolution image can be obtained by combining the propagating waves 914 and the evanescent waves 916 using well-known image processing techniques, such as the image processing techniques described in the reference: V. Krishnamurthi, B. Bailey, and F. Lanni, "Image processing in 3-D standing-wave fluorescence microscopy," Proceedings of the SPIE, vol. 2655, pp 18-25 (1996).

In certain embodiments, these grating periods can be $L=2\pi/(nk_0)$ where n is a positive integer. At each measurement step, n evanescent waves with a lateral spatial component satisfying the condition:

$$nk_0 < |k|(n+1)k_0$$

are collected. Again, since the transfer function of the device 300 can be obtained through a calibration process prior to collecting the image data or at the time of fabrication, the evanescent image data for different values of n and the propagating image data for the no-grating state can be processed using well-known methods in order to obtain an image of the objects 902 with higher resolution than the diffraction limit.

Figure 11A:
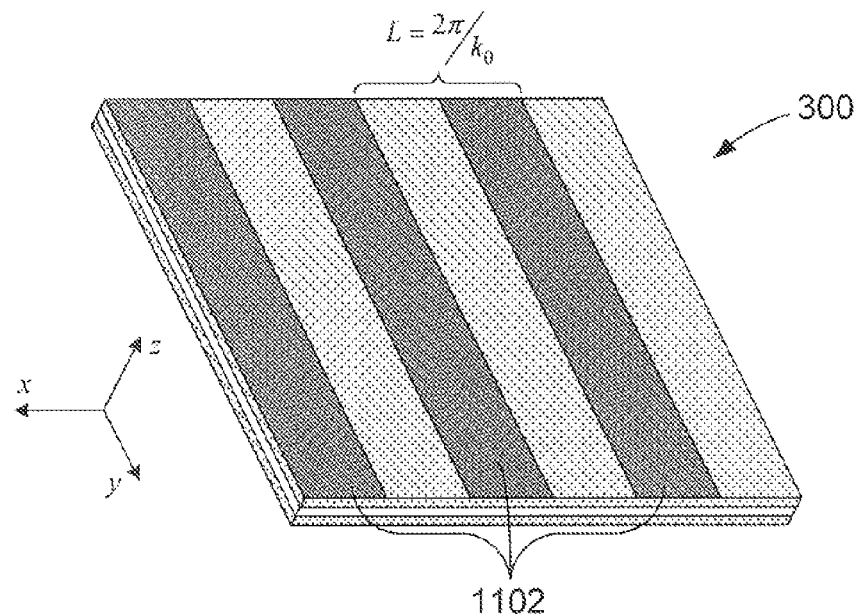
FIGS. 11A-11B show operation of an electronically reconfigurable device configured with a first one-dimensional diffraction grating in accordance with embodiments of the present invention.

FIG. 11A shows the device 300 electronically configured with a first one-dimensional diffraction grating in accordance with embodiments of the present invention. The diffraction grating is obtained by applying appropriate electronic signals to corresponding nanowires of regions 1102, shifting the effective refractive index of the regions 1102, as described above with reference to FIGS. 3-5. The grating lattice period corresponding to n equal to 1 is:

$$L = \frac{2\pi}{k_0}$$

Electromagnetic waves reaching the far field are a mixture of propagating and evanescent waves of the object. The originally propagating waves experience zero order diffraction and have lateral spatial components satisfying the condition:

$$|k| < k_0.$$

The evanescent waves reaching the far field experience first order diffraction and have lateral spatial components satisfying the condition:

$$k_0 < |k| < 2k_0.$$

Figure 11B:
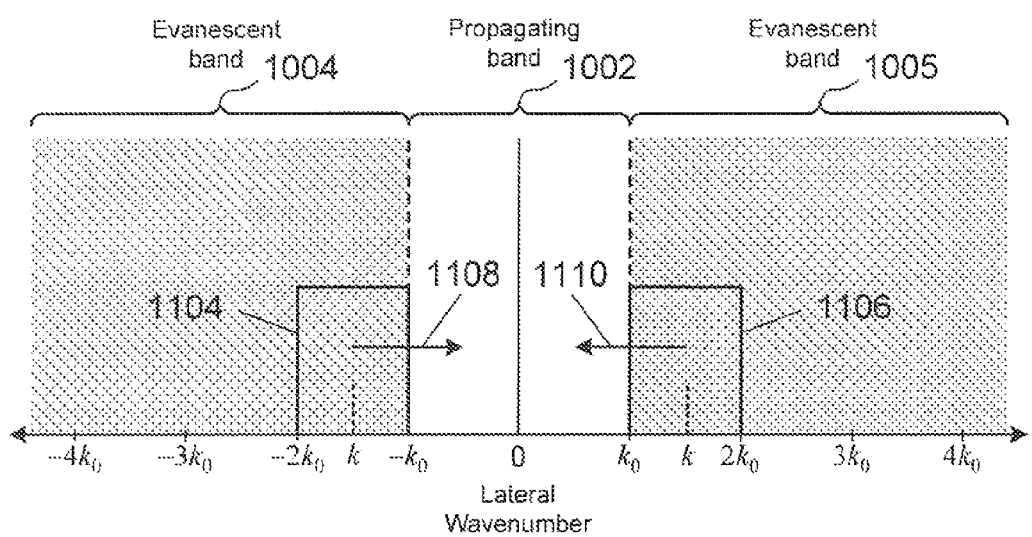

FIG. 11B shows a plot of propagating and evanescent bands associated with the first one-dimensional diffraction grating for the device 300 in accordance with embodiments of the present invention. Propagating waves with lateral spatial components in the propagating band 1002 pass through the device 300 into the far field. FIG. 11B includes boxes 1104 and 1106 that identify the wavenumbers associated with lateral spatial components of the evanescent waves that are transferred from the evanescent bands 1004 and 1005 into the propagating band 1002, as indicated by directional arrows 1108 and 1110.

Figure 12A:
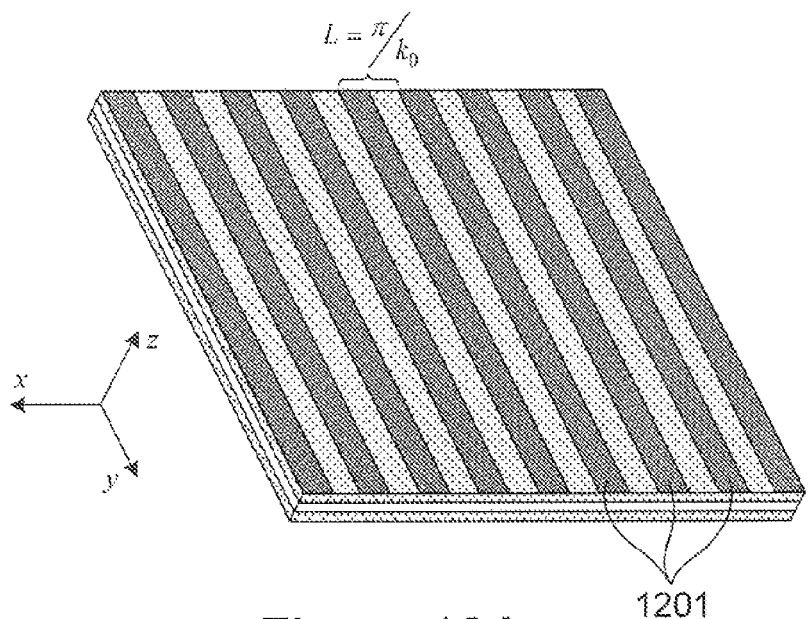
FIGS. 12A-12B show operation of an electronically reconfigurable device configured with a second one-dimensional diffraction grating in accordance with embodiments of the present invention.

Embodiments of the present invention include reconfiguring the device 300 with smaller lattice periods for larger values of n in order to collect different evanescent waves scattered from the object. FIG. 12A shows the device 300 electronically configured in a second one-dimensional diffraction grating in accordance with embodiments of the present invention. The diffraction grating is determined by applying appropriate electronic signals to corresponding nanowires of regions 1201, shifting the effective refractive index of the regions 1201, as described above with reference to FIGS. 3-5. The grating lattice period corresponding to n equal to 2 is:

$$L = \frac{\pi}{k_0}.$$

Like the first diffraction grating described above with reference to FIG. 11A, electromagnetic waves reaching the far field are a mixture of propagating waves and evanescent waves scattered from the object. Again, the propagating waves have zero order diffraction and lateral spatial components satisfying the condition:

$|k| < k_0$.

But, in this case, the originally evanescent waves to reach the far field also experience first order diffraction and have lateral spatial components satisfying the condition:

$2k_0 < |k| < 3k_0$.

Figure 12B:
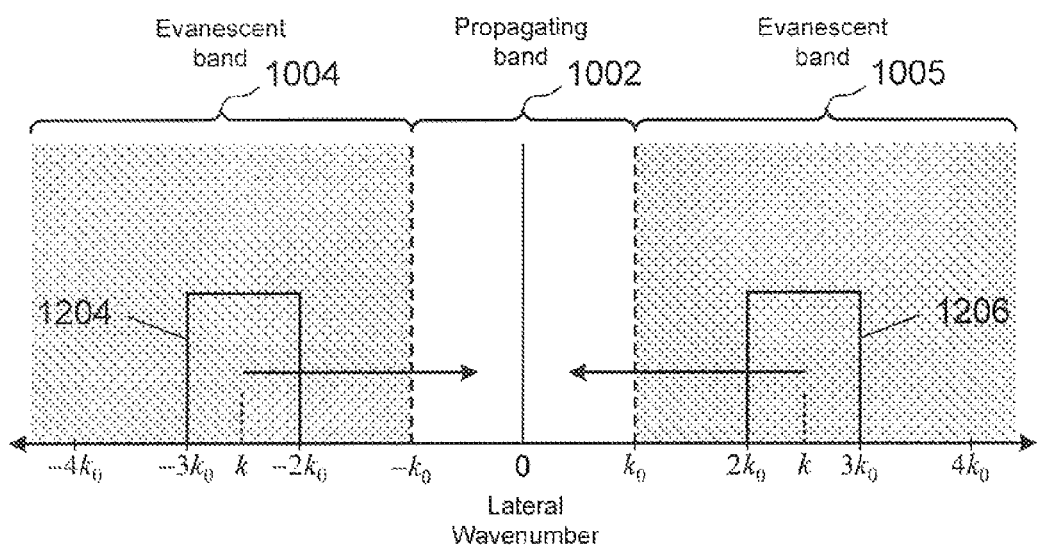

FIG. 12B shows a plot of propagating and evanescent bands associated with the second one-dimensional diffraction grating for the device 300 in accordance with embodiments of the present invention. Propagating waves with lateral spatial component wavenumbers k in the propagating band 1002 experience zero order diffraction and pass through the device 300 into the far field. FIG. 12B includes boxes 1204 and 1206 that identify the evanescent waves with lateral spatial component wavenumbers that lie within the evanescent bands 1004 and 1005 and are transferred into the propagating band 1002.

Note that no mechanic movement is required during the measurement, which can greatly increase the image quality and the operating speed high-resolution image collection. The grating of the device 300 can be electrically configured into different gratings with different lattice periods. By this means, high spatial frequency components can be collected by the imaging system 904.

Figure 13:
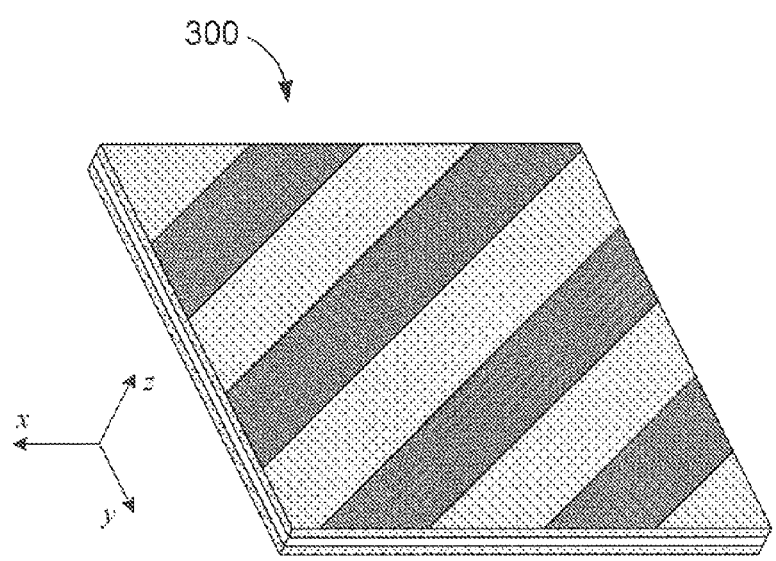
FIG. 13 shows a reconfigurable device electronically configured with a one-dimensional grating rotated in accordance with embodiments of the present invention

Embodiments are not limited to the gratings for each n having fixed orientations. In other embodiments, for the same n, the grating orientation can be rotated a number of times and the evanescent image data collected for each orientation. For example, FIG. 13 shows the device 300 electronically configured so that the first one-dimensional grating show in FIG. 11A is rotated about the z-direction by about 45° within xy-plane in accordance with embodiments of the present invention. Thus, embodiments of the present invention also include collecting evanescent image data for a fixed n, but for one or more different orientations of the grating without having to physically rotate the device 300.

Figure 14B:
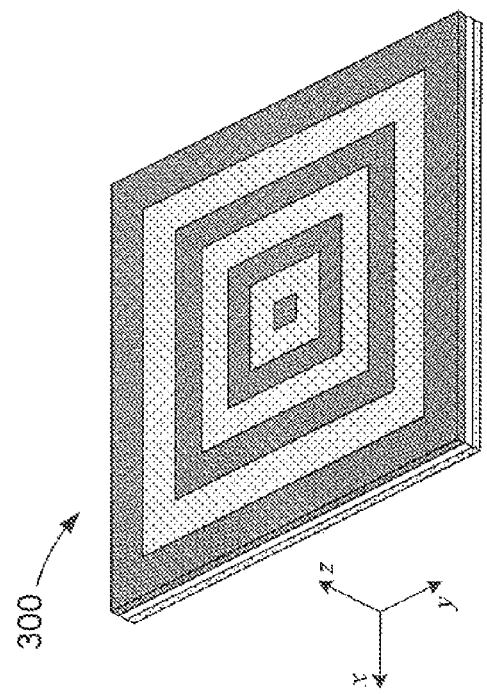
FIGS. 14A-14C shows three exemplary two-dimensional gratings for an electronically reconfigurable device operated in accordance with embodiments of the present invention.
Figure 14A:
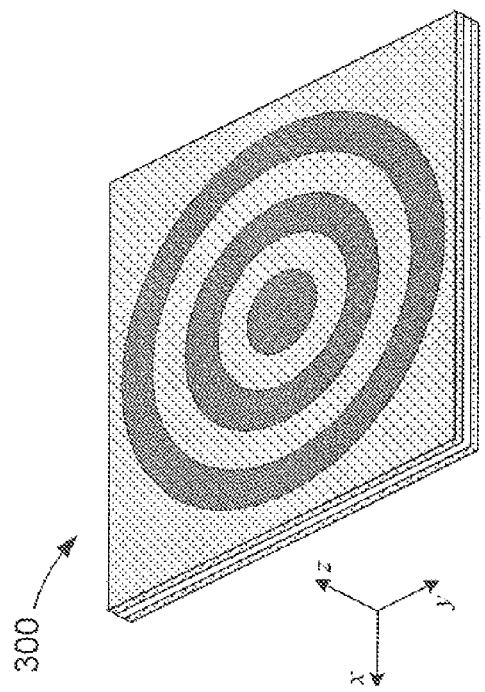
Figure 14C:
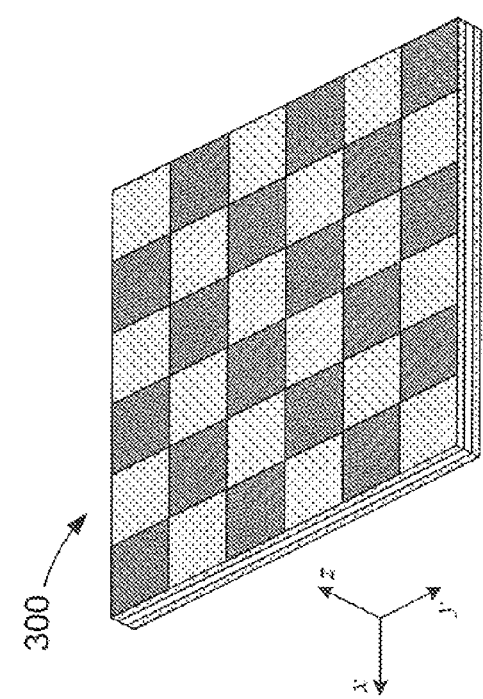

Embodiments of the present invention are also not limited to one-dimensional gratings, as described above with reference to FIGS. 11-13. In other embodiments, the reconfigurable device 300 can be electronically configured with two-dimensional gratings in order to project evanescent waves into the far field. FIG. 14A shows an example of a first two-dimensional grating comprising concentric circles in accordance with embodiments of the present invention. FIG. 14B shows an example of a second two-dimensional grating comprising concentric squares in accordance with embodiments of the present invention. FIG. 14C shows an example of a third two-dimensional grating comprising a checker-board pattern in accordance with embodiments of the present invention. In all three examples shown in FIGS. 14A-14C, the lattice period can be adjusted for subsequent collections of the evanescent waves. The electronic reconfigurability of the device 300 allows for other grating patterns, including random refractive index patterns.

Figure 15:
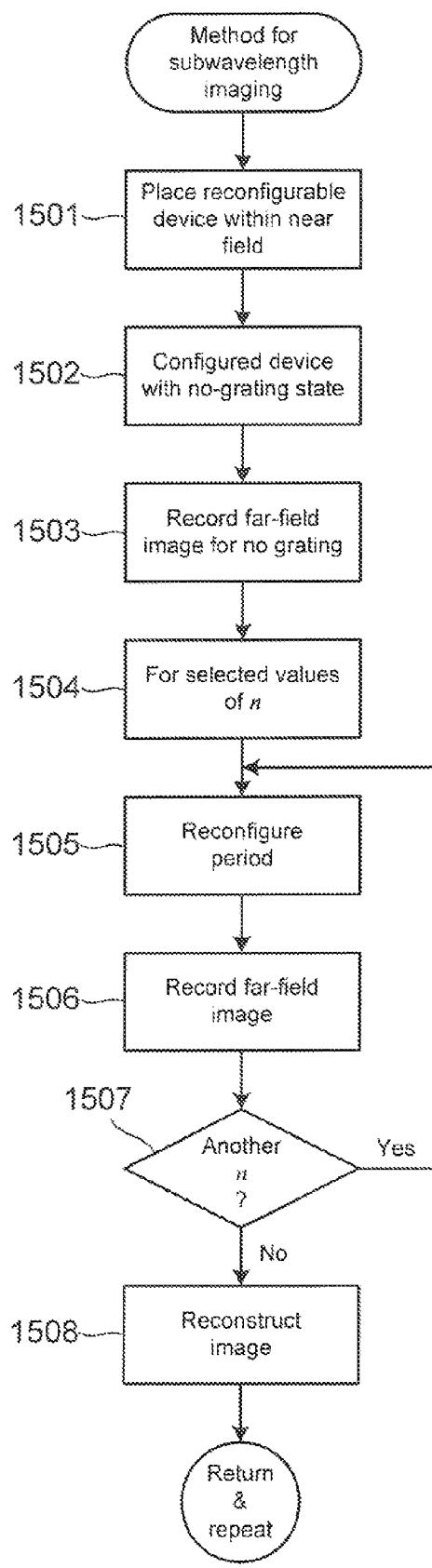
FIG. 15 shows a control-flow diagram of a method for obtaining a sub-wavelength image in accordance with embodiments of the present invention.

FIG. 15 shows a control-flow diagram of a method for obtaining a sub-wavelength image in accordance with embodiments of the present invention. In step 1501, the electronically reconfigurable device 300 is placed within at least a portion of the near field of an object or objects, as described above with reference to FIG. 9. In step 1502, the device 300 is configured in a no-grating state, as described above with reference to FIG. 10. In step 1503, image data for propagating waves passing through the device 300 in the no-grating state is recorded at an imaging system. In the for-loop of step 1504, steps 1505-1507 are repeated for select values of n. In step 1505, the device is configured with a grating, as described above with reference to FIGS. 11-14. In step 1506, a complete measurement to obtain image data for the originally propagating and evanescent waves passing through the device 300 for a given grating is performed as described before. In step 1507, when another n is selected, steps 1505 and 1506 are repeated and the grating is reconfigured in step 1505 as described above with reference to FIGS. 11-14. Otherwise, the method proceeds to step 1508 where the image data obtained in steps 1503 and repeated step 1506 is processed using well-known imaging techniques to obtain an image of the object or objects with higher resolution than the diffraction limit.

Figure 16:
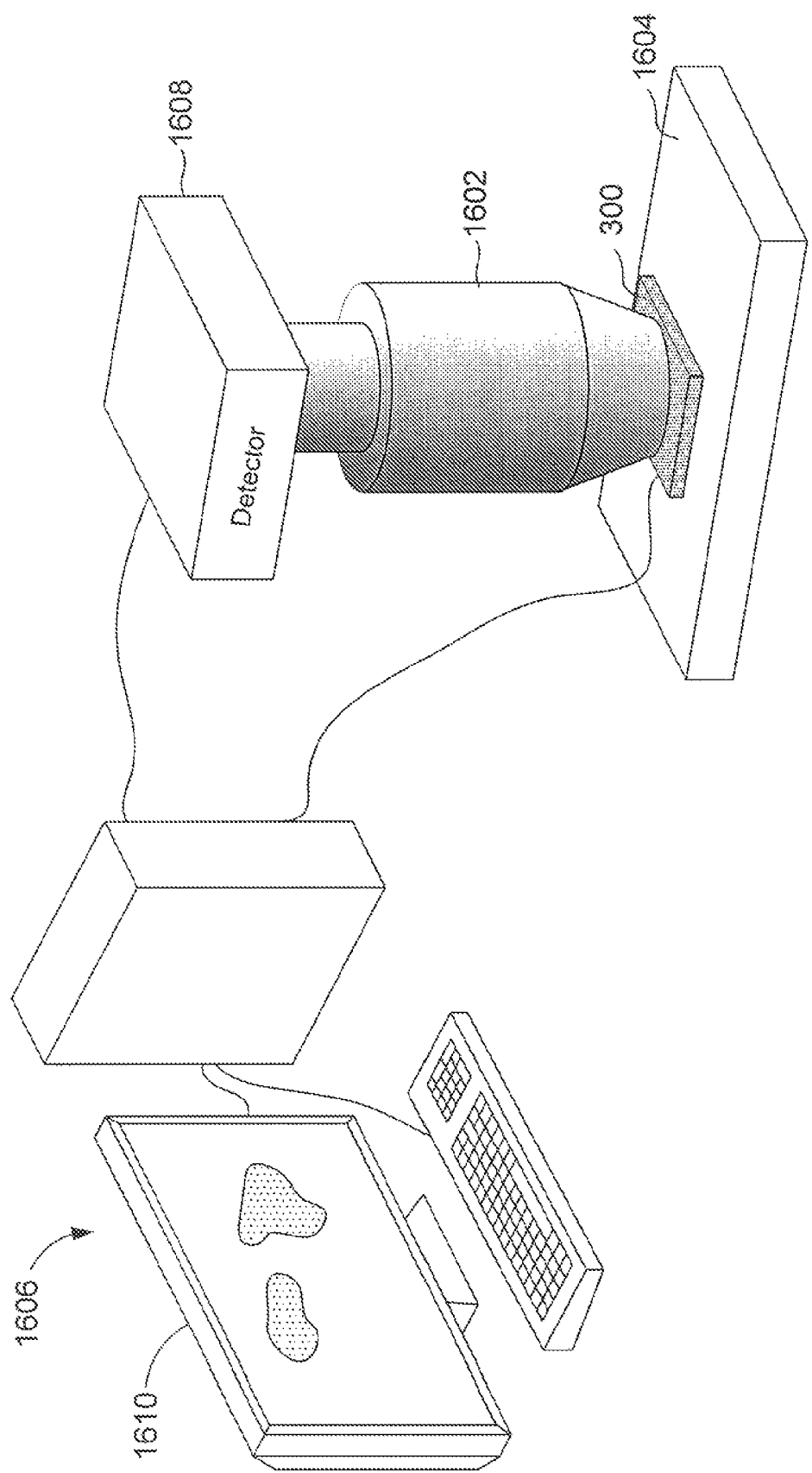
FIG. 16 shows an exemplary system for collecting high resolution images in accordance with embodiments of the present invention.

The reconfigurable device 300 can be included as a lensing element in a microscope objective in order to collect the evanescent waves emitting by objects. FIG. 16 shows an exemplary implementation of the reconfigurable device 300 disposed at the base of an objective 1602 of a microscope (not shown) between the slide 1604 and the objective lenses in accordance with embodiments of the present invention. The method described above with reference to FIG. 15 is implemented in a computer program that is executed by a computing device 1606. As shown in FIG. 16, the device 300 is electronically coupled to the computing device 1606 and propagating and evanescent image data is collected by a detector 1608, as described above. The image data is sent from the detector 1608 to the computing device 1606 for image processing and images of the objects disposed on the slide 1604 can be displayed on a monitor 1610. In practice, the computing device 1606 can be any electronic device configured to process image data and electronically control the device 300, including, but not limited to: a desktop computer, a workstation, a laptop computer, a portable computer, a display system, a computer monitor, a personal digital assistant, a handheld electronic device, an embedded electronic device, or an appliance.

Figure 17:
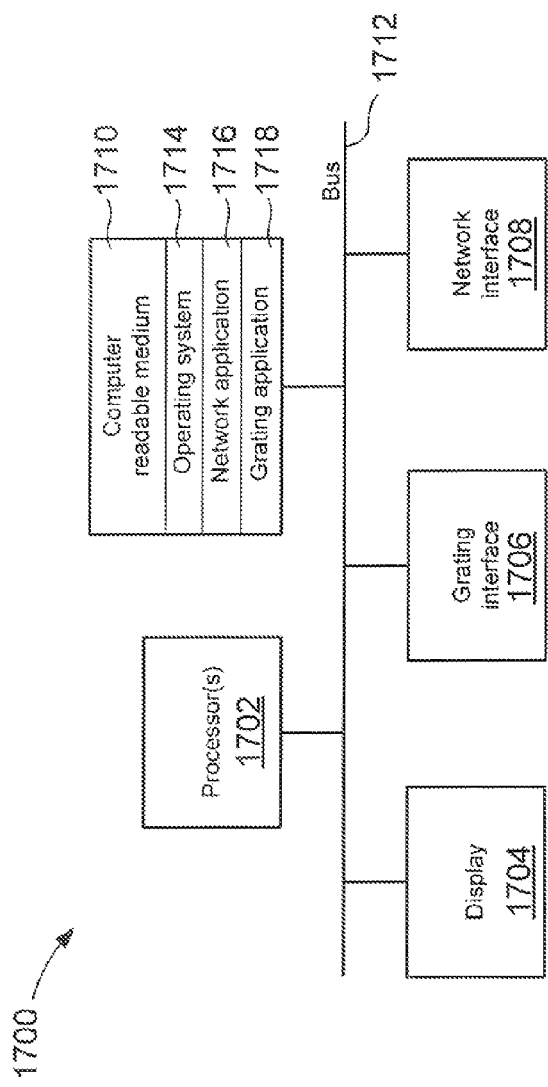
FIG. 17 shows a schematic representation of a computing device configured in accordance with embodiments of the present invention.

FIG. 17 shows a schematic representation of a computing device 1700 configured in accordance with embodiments of the present invention. The system 1700 includes one or more processors 1702, such as a central processing unit; one or more display devices 1704, such as a monitor; a reconfigurable device 300 interface 1706; optionally one or more network interfaces 1708, such as a USB port, an Ethernet, or FireWire port; one or more computer-readable mediums 1710. Each of these components is operatively coupled to one or more buses 1712. For example, the bus 1712 can be an EISA, a PCI, a USB, a FireWire, a NuBus, or a PDS.

The computer readable medium 1710 can be any medium that participates in providing instructions to the processor 1702 for execution and storage of data regarding electronically addressing the reconfigurable device 300. For example, the computer readable medium 1710 can be non-volatile media, such as an optical or a magnetic disk; volatile media, such as memory; and transmission media, such as coaxial cables, copper wire, and fiber optics. Transmission media can also take the form of acoustic, electromagnetic radiation, or radio frequency waves.

The computer-readable medium 1710 also includes an operating system 1714, such as Mac OS, Windows, Unix, and Linux; network applications 1716; and a reconfigurable device 300 application 1718. The operating system 1714 can be multi-user, multiprocessing, multitasking, multithreading, real-time and the like. The operating system 1714 can also perform basic tasks such as recognizing input from input devices, such as a keyboard or a keypad; sending output to the display 1704; keeping track of files and directories on medium 1710; controlling peripheral devices, such as disk drives, printers, and the reconfigurable device 300; and managing traffic on the one or more buses 1712. The network applications 1716 includes various components for establishing and maintaining network connections, such as software for implementing communication protocols including TCP/IP, HTTP, Ethernet, USB, and FireWire. The computer readable medium 1710 can also store other software applications, including word processors, browsers, e-mail, Instant Messaging, and media players.

The grating application 1718 provides various software components for enabling electronic addressing of nanowire intersections of the reconfigurable device 300, as described above with reference to FIGS. 4-6. In certain embodiments, some or all of the processes performed by the application 1718 can be integrated into the operating system 1714. In certain embodiments, the processes can be at least partially implemented in digital electronic circuitry, or in computer hardware, firmware, software, or in any combination thereof.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents.

The invention claimed is:

1. A system for generating a sub-diffraction limited image of an object, the system comprising:
   an imaging system;
   a reconfigurable device disposed between the object and the imaging system; and
   a computing device including a processor and a memory that executes a computer program that:
      electronically configures the reconfigurable device to operate as a grating for one or more grating lattice periods using the computing device, wherein propagating waves pass through the reconfigurable device and a portion of evanescent waves scattered from the object are projected into the far field of the object, after being scattered from the reconfigurable device,
      records propagating image data associated with propagating waves scattered from the object using the computing device, and
      records evanescent image data associated with the portion of evanescent waves projected into the far field for one or more grating lattice periods using the computing device for each lattice period.

2. The system of claim 1 further comprising an objective for directing the propagating and evanescent waves of the object to the imaging system.

3. The system of claim 1 wherein the imaging system comprises an image sensor.

4. The system of claim 1 wherein the reconfigurable device is placed within at least a portion of the near field emitted from the object.

5. The system of claim 1 wherein the computing device executes the computer program to apply electronic signals to the reconfigurable device that shift effective refractive indices of selected regions of the reconfigurable device.

6. The system of claim 1 wherein the computing device executes the computer program to configure the effective refractive indices of alternating regions of the reconfigurable device to operate as a one-dimensional grating.

7. The system of claim 1 wherein the computing device executes the computer program to configure the effective refractive indices of alternating regions of the reconfigurable device to operate as a two-dimensional grating.

8. The system of claim 1 wherein the computing device executes the computer program to rotate the grating two or more times within the plane of the reconfigurable device for a selected grating lattice period.

9. The system of claim 1 wherein the reconfigurable device further comprises:
   a first layer of non-crossing approximately parallel nanowires;
   a second layer of non-crossing approximately parallel nanowires, each nanowire in the second layer overlaying the nanowires in the first layer; and
   an electro-optical layer disposed between the first layer and second layer such that refractive index of the electro-optical layer at nanowire intersections changes in accordance with electronic signals applied to the intersecting nanowires in the first and second layers.

10. The system of claim 1 wherein the computer program further comprises instructions for reconstructing an image of the object based on the propagating image data and the evanescent image data using the computing device.

11. A method for collecting electromagnetic waves scattered from an object, the method comprising:

electronically configuring a reconfigurable device to operate as a grating for one or more lattice periods using a computing device, wherein, for each lattice period, propagating waves scattered from the object pass through the reconfigurable device and a portion of evanescent waves scattered from the object are diffracted into propagating components of the propagating waves by the grating and are projected into the far field of the object;

detecting the propagating waves using an imaging system for each lattice period; and detecting the portion of evanescent waves projected into the far field for each lattice period using the imaging system.

12. The method of claim 11 further comprising placing the reconfigurable device within at least a portion of the near field emitted from the object.

13. The method of claim 11 further comprising recording evanescent image data associated with the portion of the evanescent waves using the computing device.

14. The method of claim 11 wherein the imaging system comprises an image sensor.

15. The method of claim 11 wherein electronically configuring the reconfigurable device to operate as a grating comprises applying electronic signals to the reconfigurable device that shift effective refractive indices of selected regions of the reconfigurable device.

16. The method of claim 11 wherein electronically configuring the reconfigurable device to operate as a grating comprises configuring effective refractive indices of alternating regions of the reconfigurable device to operate as a one-dimensional grating or a two-dimensional grating.

17. The method of claim 11 wherein electronically configuring the reconfigurable device to operate as grating comprises rotating the grating two or more times within the plane of the reconfigurable device for a selected grating lattice period.

18. The method of claim 11 wherein propagating waves scattered from the object pass through the reconfigurable device and experience zero order diffraction, and the portion of evanescent waves scattered from the object pass through the reconfigurable device and experience first order diffraction.

19. The method of claim 11 wherein propagating waves scattered from the object pass through the reconfigurable device when the reconfigurable device is electronically configured in a no-grating state.

20. The method of claim 11 further comprising reconstructing an image of the object based on image data associated with detecting the propagating waves and detecting the evanescent waves for each lattice using the computing device.

* * * * *

UNITED STATES PATENT AND TRADEMARK OFFICE
CERTIFICATE OF CORRECTION

| | |
|---|---|
| PATENT NO. | : 8,045,253 B2 |
| APPLICATION NO. | : 12/473402 |
| DATED | : October 25, 2011 |
| INVENTOR(S) | : Jingjing Li et al. |

It is certified that error appears in the above-identified patent and that said Letters Patent is hereby corrected as shown below:

In column 10, line 55, after " $L = \frac{2\pi}{k_0}$ " insert -- . --.

In column 14, line 39, in Claim 6, after "configure" delete "the".

In column 14, line 43, in Claim 7, after "configure" delete "the".

Signed and Sealed this
Nineteenth Day of June, 2012

David J. Kappos
*Director of the United States Patent and Trademark Office*